| United States Patent [19] | [11] Patent Number: 4,983,696 |
| Soga et al. | [45] Date of Patent: Jan. 8, 1991 |

[54] PROCESS FOR PRODUCING POLYACETYLENE

[75] Inventors: Mamoru Soga, Osaka; Shu Hotta, Kawasaki; Nobuo Sonoda, Settsu, all of Japan

[73] Assignee: Matsushita Electric Industrial Co., Ltd., Osaka, Japan

[21] Appl. No.: 465,421

[22] Filed: Jan. 16, 1990

[30] Foreign Application Priority Data

Jan. 25, 1989 [JP] Japan .................................. 1-015406
Apr. 10, 1989 [JP] Japan .................................. 1-090175

[51] Int. Cl.$^5$ ............................................. C08F 138/02
[52] U.S. Cl. ...................................... 526/159; 526/285
[58] Field of Search ........................ 526/159, 285, 160

[56] References Cited

FOREIGN PATENT DOCUMENTS 0113658  7/1984  European Pat. Off. ............ 526/285
2126592  3/1984  United Kingdom ................ 526/285

*Primary Examiner*—Fred Teskin
*Attorney, Agent, or Firm*—Stevens, Davis, Miller & Mosher

[57] ABSTRACT

A polyacetylene with excellent stretchability can be obtained by a process which comprises polymerizing acetylene with a Ziegler-Natta catalyst consisting of a tetraalkyl titanate and a trialkylaluminum, wherein in the Ziegler-Natta catalyst at least one of the tetraalkyl titanate and the trialkylaluminum has a long chain alkyl group and the molar ratio of al to Ti is 1.5–10.

1 Claim, No Drawings

PROCESS FOR PRODUCING POLYACETYLENE

FIELD OF THE INVENTION AND RELATED ART STATEMENT

The present invention relates to a process for producing a polyacetylene superior in mechanical properties, particularly stretchability.

It has been well known that a polyacetylene can be obtained by, for example, polymerizing acetylene with a Ziegler-Natta catalyst consisting of triethylaluminum and tetrabutyl titanate. (cf. J. Polym. Sci., Polym. Chem. Ed., 12, 11, 1974)

The polyacetylene obtained with the above Ziegler-Natta catalyst, however, has a limit in stretchability and has a stretchability of only about 3-5 times. In contacting acetylene gas with the above Ziegler-Natta catalyst, the thermal treatment of the Ziegler-Natta catalyst at 80°-150° C. in an inert gas prior to said contact gives a little increase in stretchability of the polyacetylene obtained, but the resulting stretchability is still insufficient.

OBJECT AND SUMMARY OF THE INVENTION

The object of the present invention is to solve the above-mentioned problems of the conventional art and provide a process for producing a polyacetylene with excellent stretchability.

According to the present invention, there is provided a process for producing a polyacetylene by polymerizing acetylene with a Ziegler-Natta catalyst consisting of a trialkylaluminum and a tetraalkyl titanate, wherein in the Ziegler-Natta catalyst at least one of the trialkylaluminum and the tetraalkyl titanate has a long chain alkyl group and the molar ratio of Al to Ti is 1.5-10.

DETAILED DESCRIPTION OF THE INVENTION

The polyacetylene produced by the process of the present invention has excellent stretchability. This is presumed to be because the use of a trialkylaluminum or a tetraalkyl titanate each having a long chain alkyl group provides the resulting Ziegler-Natta catalyst with reduced activity, the polymerization of acetylene proceeds relatively mildly, and there is obtained a polyacetylene with a dense structure and furthermore because allowing the molar ratio of Al to Ti to be in the range of 1.5-10 enables efficient formation of an alkyl aluminum-alkyl titanate complex, and there is obtained a polyacetylene with a uniform polymerization degree.

The Ziegler-Natta catalyst used in the present invention for acetylene polymerization is constituted by a trialkylaluminum and a tetraalkyl titanate, and the trialkylaluminum or the tetraalkyl titanate has a long chain alkyl group.

As the alkyl group, there can be cited, for example, methyl group, ethyl group, propyl group, butyl group, pentyl group, hexyl group, heptyl group, octyl group, decyl group, dodecyl group, tetradecyl group, hexadecyl group and octadecyl group.

In the present invention, the long chain alkyl group refers to an alkyl group of 6 or more carbon atoms, and there are preferred long chain alkyl groups of 6-10 carbon atoms.

As the trialkylaluminum having an alkyl group of 6 or more carbon atoms which is used in the present invention, there can be cited, for example, tri-n-hexylaluminum, tri-n-octylaluminum, tri-n-decylaluminum, tri-n-dodecylaluminum, tri-n-tetradecylaluminum, tri-n-hexadecylaluminum and tri-n-octadecylaluminum.

As the tetraalkyl titanate having an alkyl group of 6 or more carbon atoms which is used in the present invention, there can be cited, for example, tetra-n-hexyl titanate, tetra-n-octyl titanate, tetra-n-decyl titanate, tetra-n-dodecyl titanate, tetra-n-tetradecyl titanate, tetra-n-hexadecyl titanate and tetra-n-octadecyl titanate.

When acetylene is polymerized using a Ziegler-Natta catalyst consisting of a tetraalkyl titanate and a trialkylaluminum having a long chain alkyl group or a Ziegler-Natta catalyst consisting of a trialkylaluminum and a tetraalkyl titanate having a long chain alkyl group, the molar ratio of Al to Ti must be 1.5-10. When the molar ratio is less than 1.5, there is formed only a fragile polyacetylene film. When the molar ratio is more than 10, no polyacetylene film is formed.

As the solvent, there can generally be used hydrocarbon solvents, aromatic solvents and ether solvents which are all unreactive with the Ziegler-Natta catalyst used together.

DESCRIPTION OF PREFERRED EMBODIMENTS

The present invention is described in more detail by way of Examples.

EXAMPLE 1

In argon atmosphere 2.8 ml of cumehe, 3.5 ml (0.0075 mol) of tri-n-octylaluminum and 1.7 ml (0.005 mol) of tetra-n-butyl titanate were mixed to prepare a catalyst solution, which was heated for 2 hours at 120° C. Thereafter 4 ml (polymerization catalyst amount) of the catalyst solution was placed in a polymerization vessel, and the argon and cumene in the vessel were removed by a vacuum pump. Then, the polymerization vessel was rotated to coat the glass inner wall of the vessel with the catalyst solution. After the pressure inside the polymerization vessel had dropped to below $10^{-2}$ Torr, the whole polymerization vessel was cooled to $-78°$ C. with a dry ice-ethanol mixed cooling medium. Acetylene gas was introduced into the polymerization vessel while keeping the vessel at the same temperature. At that time, the gas pressure inside the polymerization vessel was controlled at about 600 Torr. Simultaneously with the introduction of acetylene gas, acetylene polymerization took place on the surface of the catalyst solution as well as on the inner wall of the vessel, and there was seen formation of a polyacetylene film. The reaction was continued for 4 hours under the same condition. Excessive acetylene gas was removed and the inside of the polymerization vessel was returned to argon atmosphere. In this atmosphere, the resultant polyacetylene film was washed with toluene. Washing was repeated until there was seen no catalyst color (blackish brown) in the solvent used. Then, the polyacetylene film was dried under vacuum. The dried polyacetylene film was cut into 10 mm×20 mm and stretched at room temperature in argon atmosphere using manual stretching machine.

EXAMPLE 2

Acetylene was polymerized in the same manner as in Example 1 except that the amount of tri-n-octylaluminum was changed to 4.5 ml (0.01 mol) and the amount of cumene was changed to 1.8 ml.

EXAMPLE 3

Acetylene was polymerized in the same manner as in Example 1 except that the tri-n-octylaluminum was changed to 3.5 ml (0.01 mol) of tri-n-hexylaluminum.

EXAMPLE 4

Acetylene was polymerized in the same manner as in Example 1 except that the tri-n-octylaluminum was changed to 5.6 ml (0.01 mol) of tri-n-decylaluminum and the amount of cumene was changed to 0.7 ml.

EXAMPLE 5

Acetylene was polymerized in the same manner as in Example 1 except that the tri-n-octylaluminum was changed to 5.5 ml (0.01 mol) of tri-n-decylaluminum, the amount of tetra-n-butyl titanate was changed to 0.85 ml (0.0025 mol) and the amount of cumene was changed to 1.65 ml.

EXAMPLE 6

Acetylene was polymerized in the same manner as in Example 1 except that the tri-n-octylaluminum was changed to 8.4 ml (0.024 mol) of tri-n-hexylaluminum, the amount of tetra-n-butyl titanate was changed to 1.0 ml (0.003 mol), the amount of cumene was changed to 2.6 ml and the amount of polymerization catalyst was changed to 10 ml.

EXAMPLE 7

Acetylene was polymerized in the same manner as in Example 1 except that the tri-n-octylaluminum was changed to 1.05 ml (0.0075 mol) of triethylaluminum, the tetra-n-butyl titanate was changed to 3.0 ml (0.005 mol) of tetra-n-octyl titanate and the amount of cumene was changed to 3.95 ml.

EXAMPLE 8

Acetylene was polymerized in the same manner as in Example 1 except that the tri-n-octylaluminum was changed to 1.4 ml (0.01 mol) of triethylaluminum, the tetra-n-butyl titanate was changed to 2.4 ml (0.005 mol) of tetra-n-hexyl titanate and the amount of cumene was changed to 4.2 ml.

EXAMPLE 9

Acetylene was polymerized in the same manner as in Example 1 except that the tri-n-octylaluminum was changed to 1.4 ml (0.01 mol) of triethylaluminum, the tetra-n-butyl titanate was changed to 3.0 ml (0.005 mol) of tetra-n-octyl titanate and the amount of cumene was changed to 3.6 ml.

EXAMPLE 10

Acetylene was polymerized in the same manner as in Example 1 except that the tri-n-octylaluminum was changed to 1.4 ml (0.01 mol) of triethylaluminum, the tetra-n-butyl titanate was changed to 3.4 ml (0.005 mol) of tetra-n-decyl titanate and the amount of cumene was changed to 3.2 ml.

EXAMPLE 11

Acetylene was polymerized in the same manner as in Example 1 except that the tri-n-octylaluminum was changed to 1.4 ml (0.01 mol) of triethylaluminum, the tetra-n-butyl titanate was changed to 1.5 ml (0.0025 mol) of tetra-n-octyl titanate and the of amount of cumene was changed to 5.1 ml.

EXAMPLE 12

Acetylene was polymerized in the same manner as in Example 1 except that the tri-n-octylaluminum was changed to 1.4 ml (0.01 mol) of triethylaluminum, the tetra-n-butyl titanate was changed to 0.6 ml (0.001 mol) of tetra-n-octyl titanate and the amount of cumene was changed to 6 ml.

EXAMPLE 13

Acetylene was polymerized in the same manner as in Example 1 except that the amount of cumene was changed to 2.1 ml, the tri-n-octylaluminum was changed to 3.5 ml (0.01 mol) of tri-n-hexylaluminum and the tetra-n-butyl titanate was changed to 2.4 ml (0.005 mol) of tetra-n-hexyl titanate.

EXAMPLE 14

Acetylene was polymerized in the same manner as in Example 1 except that the amount of cumene was changed to 2.5 ml, the tri-n-octylaluminum was changed to 4.5 ml of tri-n-octylaluminum, the tetra-n-butyl titanate was changed to 3.0 ml of tetra-n-octyl titanate and the amount of polymerization catalyst was changed to 5 ml.

EXAMPLE 15

Acetylene was polymerized in the same manner as in Example 1 except that the amount of cumene was changed to 5.5 ml, the tri-n-octylaluminum was changed to 5.5 ml of tri-n-decylaluminum, the tetra-n-butyl titanate was changed to 3.0 ml of tetra-n-octyl titanate and the amount of polymerization catalyst was changed to 7 ml.

EXAMPLE 16

Acetylene was polymerized in the same manner as in Example 1 except that the amount of cumene was changed to 5.1 ml, the tri-n-octylaluminum was changed to 5.5 ml of tri-n-decylaluminum, the tetra-n-butyl titanate was changed to 3.4 ml of tetra-n-decyl titanate and the amount of polymerization catalyst was changed to 7 ml.

COMPARATIVE EXAMPLE 1

Acetylene was polymerized in the same manner as in Example 1 except that the tri-n-octylaluminum was changed to 1.4 ml (0.01 mol) of triethylaluminum and the amount of cumene was changed to 4.9 ml.

COMPARATIVE EXAMPLE 2

Acetylene was polymerized in the same manner as in Example 1 except that the tri-n-octylaluminum was changed to 1.4 ml of triethylaluminum and the amount of cumene was changed to 1.8 ml.

The measurement results of stretchability (times) for the polyacetylenes of Examples 1–12 and Comparative Example 1 are shown in Table 1.

TABLE 1

| | Catalyst | | | Stretch- |
| | Trialkyl-aluminum | Tetraalkyl titanate | Al/Ti molar ratio | ability (times) |
| --- | --- | --- | --- | --- |
| Example 1 | Tri-n-octyl aluminum | Tetra-n-butyl titanate | 1.5 | 8 |
| Example 2 | Tri-n-octyl aluminum | Tetra-n-butyl titanate | 2 | 8 |
| Example 3 | Tri-n-hexyl aluminum | Tetra-n-butyl titanate | 2 | 6 |

TABLE 1-continued

| | Catalyst | | | Stretch- |
|---|---|---|---|---|
| | Trialkyl-aluminum | Tetraalkyl titanate | Al/Ti molar ratio | ability (times) |
| Example 4 | Tri-n-decyl aluminum | Tetra-n-butyl titanate | 2 | 8 |
| Example 5 | Tri-n-decyl aluminum | Tetra-n-butyl titanate | 4 | 6 |
| Example 6 | Tri-n-hexyl aluminum | Tetra-n-butyl titanate | 8 | 8 |
| Example 7 | Triethyl aluminum | Tetra-n-octyl titanate | 1.5 | 8 |
| Example 8 | Triethyl aluminum | Tetra-n-hexyl titanate | 2 | 10 |
| Example 9 | Triethyl aluminum | Tetra-n-octyl titanate | 2 | 10 |
| Example 10 | Triethyl aluminum | Tetra-n-decyl titanate | 2 | 8 |
| Example 11 | Triethyl aluminum | Tetra-n-octyl titanate | 4 | 10 |
| Example 12 | Triethyl aluminum | Tetra-n-octyl titanate | 10 | 8 |
| Comparative Example 1 | Triethyl aluminum | Tetra-n-butyl titanate | 2 | 4 |

As is clear from Table 1, the polyacetylene obtained by polymerizing acetylene with a Ziegler-Natta catalyst consisting of triethylaluminum and tetra-n-butyl titanate showed a stretchability of 4 times, while the polyacetylenes obtained by polymerizing acetylene with the Ziegler-Natta catalysts of the present invention showed stretachabilities of at least 6 times. In the present invention, the stretchability (times) refers to such a maximum stretchability (times) as when stretching is made beyond it, there occurs breakage.

The polyacetylene films obtained according to the process of the present invention were stretched and then cut into 2 mm×20 mm. Each piece was measured for conductivity in stretching direction by the four-probe method, while doping the piece with iodine in gas phase. The conductivities were $10^3$–$10^4$ S/cm and the polyacetylene obtained in Example 2 showed the highest value of 24,000 S/cm.

The measurement results of stretchability 20 (times) for the polyacetylenes of Examples 13–16 and Comparative Example 2 are shown in Table 2.

TABLE 2

| | Catalyst | | | Stretch- |
|---|---|---|---|---|
| | Trialkyl-aluminum | Tetraalkyl titanate | Al/Ti molar ratio | ability (times) |
| Example 13 | Tri-n-hexyl aluminum | Tetra-n-hexyl titanate | 2.0 | 8 |
| Example 14 | Tri-n-octyl aluminum | Tetra-n-octyl titanate | 2.0 | 9 |
| Example 15 | Tri-n-decyl aluminum | Tetra-n-octyl titanate | 2.0 | 8 |
| Example 16 | Tri-n-decyl aluminum | Tetra-n-decyl titanate | 2.0 | 10 |
| Comparative Example 2 | Triethyl aluminum | Tetra-n-butyl titanate | 2.0 | 4 |

As is clear from Table 2, the polyacetylene of Comparative Example 2 obtained by polymerizing acetylene with a Ziegler-Natta catalyst consisting of triethylaluminum and tetra-n-butyl titanate showed a stretchability of 4 times, while the polyacetylenes obtained by polymerizing acetylene with the Ziegler-Natta catalysts of the present invention showed stretchabilities of at least 8 times. In the present invention, the stretchability (times) refers to such a maximum stretchability (times) as when stretching is made beyond it, there occurs breakage.

The polyacetylene films obtained according to the process of the present invention were stretched and then cut into 2 mm×20 mm. Each piece was measured for conductivity in stretching direction by the four-probe method, while doping the piece with iodine in gas phase. The conductivities were $10^3$–$10^4$ S/cm.

As understood from the above, there can be obtained a polyacetylene of excellent stretchability according to the process of the present invention.

What is claimed is:

1. A process for producing a polyacetylene by polymerizing acetylene with a Ziegler-Natta catalyst consisting of a tetraalkyl titanate and a trialkylaluminum, wherein the Ziegler-Natta catalyst at least one of the tetraalkyl titanate and the trialkylaluminum has a long chain alkyl group having 6–10 carbon atoms and the molar ratio of Al to Ti is 1.5–10.

* * * * *